(12) United States Patent
Catreux-Erceg et al.

(10) Patent No.: US 7,706,827 B2
(45) Date of Patent: *Apr. 27, 2010

(54) METHOD AND APPARATUS FOR PROCESSING TRANSMIT POWER CONTROL (TPC) COMMANDS IN A WIDEBAND CDMA (WCDMA) NETWORK BASED ON A SIGN METRIC

(75) Inventors: Severine Catreux-Erceg, Cardiff, CA (US); Mark Kent, Vista, CA (US); Louis Botha, San Diego, CA (US)

(73) Assignee: Broadcom Corporation

( * ) Notice: Subject to any disclaimer, the term of this patent is extended or adjusted under 35 U.S.C. 154(b) by 989 days.

This patent is subject to a terminal disclaimer.

(21) Appl. No.: 11/355,111

(22) Filed: Feb. 15, 2006

(65) Prior Publication Data
US 2007/0191047 A1    Aug. 16, 2007

(51) Int. Cl.
*H04Q 7/20* (2006.01)
*H04B 7/00* (2006.01)
*H04B 1/04* (2006.01)

(52) U.S. Cl. .................. 455/522; 455/69; 455/127.1
(58) Field of Classification Search .............. 455/69, 455/127.1, 522; 370/335
See application file for complete search history.

(56) References Cited

U.S. PATENT DOCUMENTS

| | | | | |
|---|---|---|---|---|
| 6,269,239 B1 * | 7/2001 | Hashem et al. | ............... | 455/69 |
| 7,248,837 B2 * | 7/2007 | Woo | ............................ | 455/69 |
| 7,353,040 B2 * | 4/2008 | Baker et al. | ................. | 455/522 |
| 2004/0166884 A1 * | 8/2004 | Oh et al. | ...................... | 455/522 |
| 2006/0046767 A1 * | 3/2006 | Hunzinger | ................... | 455/522 |
| 2006/0262754 A1 * | 11/2006 | Andersson et al. | .......... | 370/332 |

* cited by examiner

*Primary Examiner*—Tilahun Gesesse
(74) *Attorney, Agent, or Firm*—McAndrews, Held & Malloy, Ltd.

(57) ABSTRACT

Method and apparatus for processing transmit power control (TPC) commands in a wideband CDMA (WCDMA) network based on a sign metric are disclosed and may include calculating a sign metric of a downlink dedicated physical channel (DPCH) based on a plurality of TPC bits received via the downlink DPCH. A value of at least one of the plurality of TPC bits may not be known when the at least one of the plurality of TPC bits is received. The sign metric may specify an error associated with the plurality of TPC bits. Transmit power may be adjusted for a signal transmitted via at least one uplink communication channel based on the calculated sign metric. At least one reliability weight value may be calculated for at least a portion of the received TCP bits, based on the calculated sign metric.

28 Claims, 7 Drawing Sheets

FIG. 5

METHOD AND APPARATUS FOR PROCESSING TRANSMIT POWER CONTROL (TPC) COMMANDS IN A WIDEBAND CDMA (WCDMA) NETWORK BASED ON A SIGN METRIC

CROSS-REFERENCE TO RELATED APPLICATIONS/INCORPORATION BY REFERENCE

This application makes reference to:

U.S. application Ser. No. 11/355,110 filed on Feb. 15, 2006;

U.S. application Ser. No. 11/355,222 filed on Feb. 15, 2006; and

U.S. application Ser. No. 11/355,109 filed on Feb. 15, 2006.

FIELD OF THE INVENTION

Certain embodiments of the invention relate to wireless communication. More specifically, certain embodiments of the invention relate to a method and apparatus for processing transmit power control (TPC) commands in a wideband CDMA (WCDMA) network based on a sign metric.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

In the case of a WCDMA downlink, multiple access interference (MAI) may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths after despreading, causing MAI. The level of intra-cell interference depends strongly on the channel response. In nearly flat fading channels, the physical channels remain almost completely orthogonal and intra-cell interference does not have any significant impact on the receiver performance. Frequency selectivity is common for the channels in WCDMA networks.

Mobile networks allow users to access services while on the move, thereby giving end users freedom in terms of mobility. However, this freedom does bring uncertainties to mobile systems. The mobility of the end users causes dynamic variations both in the link quality and the interference level, sometimes requiring that a particular user change its serving base station. This process is known as handover (HO). Handover is the essential component for dealing with the mobility of end users. It guarantees the continuity of the wireless services when the mobile user moves across cellular boundaries.

WCDMA networks may enable a mobile handset to communicate with a multiple number of cell sites. This may take place, for example, during a soft-handoff from one cell site to another. Soft-handoffs may involve cell sites that use the same frequency bandwidth. There may also be handoffs from one cell site to another where the two cell sites use different frequencies. In these cases, the mobile handset may need to tune to the frequency of the new cell site. Additional circuitry may be required to handle communication over a second frequency of the second cell site while still using the first frequency for communicating with the first cell site. The additional circuitry may be an undesirable extra cost for the mobile handset. In addition, the mobile handset may require different transmit power to establish and maintain a communication link with the new cell site.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or apparatus for processing transmit power control (TPC) commands in a wideband CDMA (WCDMA) network based on a sign metric, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and a system for processing transmit power control (TPC) commands in a wideband CDMA (WCDMA) network based on a sign metric. Various aspects of the method may comprise calculating a sign metric of a downlink dedicated physical channel (DPCH) based on a plurality of TPC bits received via the downlink DPCH. A value of at least one of the plurality of TPC bits may not be known when the at least one of the plurality of TPC bits is received. The sign metric may specify an error associated with the plurality of TPC bits. Transmit power may be adjusted for a signal transmitted via at least one uplink communication channel based on the calculated sign metric. At least one reliability weight value may be calculated for at least a portion of the received TPC bits, based on the calculated sign metric. A total TPC command may be calculated for the uplink communication path based on the plurality of received TPC bits and the calculated reliability weight value. A selected reliability weight value may be discarded from the calculation of the total TPC command, if the selected reliability weight value is higher than a threshold value. The transmit power may be adjusted for the uplink communication channel based on the calculated total TPC command.

Uplink power control (PC) is of paramount importance for CDMA-based systems because the capacity of such a system is a function of the interference level. The power transmitted by all active user equipments (UE) within a network may be controlled to limit interference levels and alleviate well-known problems such as the "near-far" effect. If there is more than one user active, the transmitted power of non-reference users is suppressed by a factor dependent on the partial cross-correlation between the code of the reference user and the code of the non-reference user. However, when a non-reference user is closer to the receiver than the reference user, it is possible that the interference caused by this non-reference user has more power than the reference user also referred to as the "near-far" effect.

There are two types of power-control techniques. Open-loop power-control where each user equipment measures its received signal power and adjusts its transmit power accordingly and closed-loop power-control where an active radio link (RL) measures the received signal power from all user equipments and simultaneously commands the individual user equipments to raise or lower their transmit uplink power such that the received signal-to-noise ratio (SNR) from all user equipments at the radio links is the same.

Figure 1A:
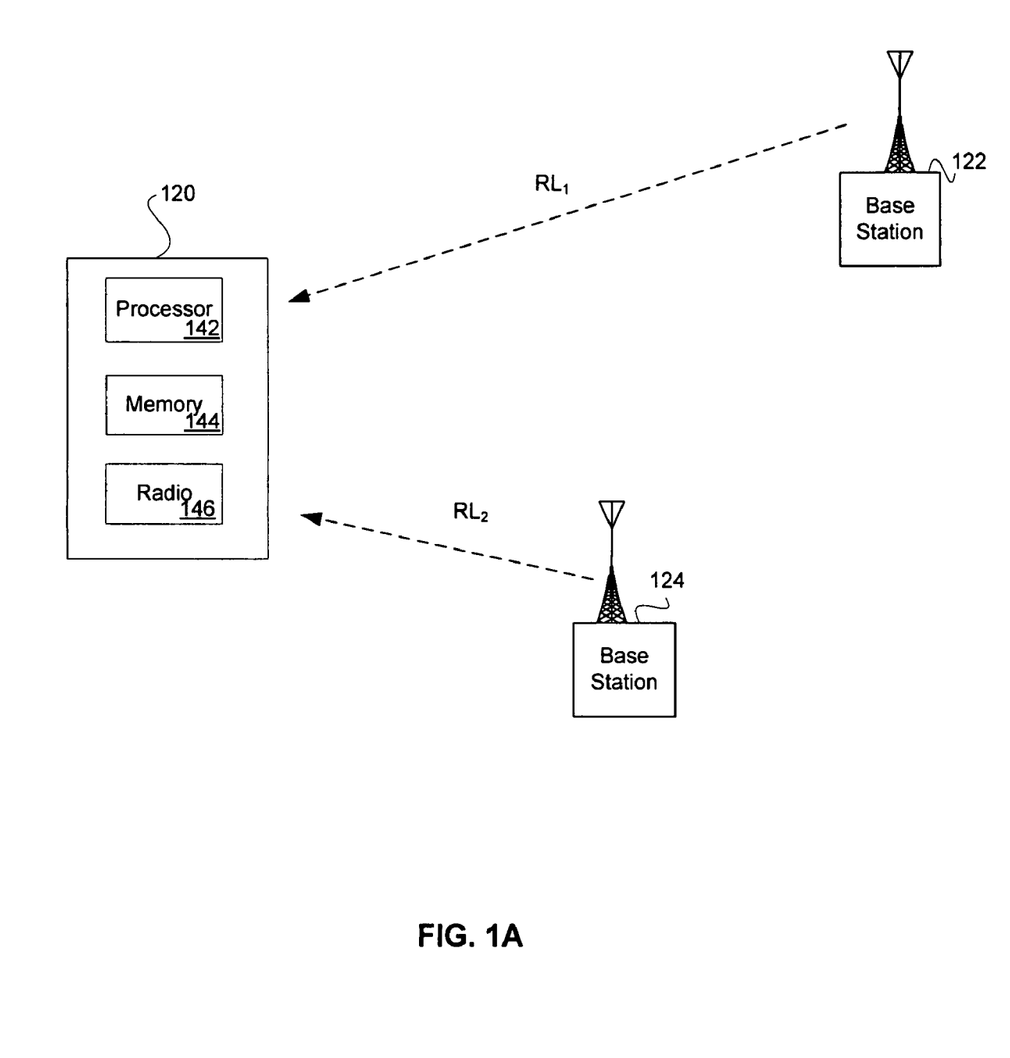
FIG. 1A is an exemplary diagram illustrating a WCDMA handset communicating with two WCDMA base stations, in accordance with an embodiment of the invention.

FIG. 1A is an exemplary diagram illustrating a WCDMA handset communicating with two WCDMA base stations, in accordance with an embodiment of the invention. Referring to FIG. 1A, there is shown a mobile handset or user equipment 120, a plurality of base stations BS 122 and BS 124 and a plurality of radio links (RL), $RL_1$ and $RL_2$ coupling the user equipment 120 with the base stations BS 122 and BS 124 respectively. The user equipment 120 may comprise a processor 142, a memory 144, and a radio 146.

The processor 142 may communicate and/or control a plurality of bits to/from the base stations BS 122 and BS 124. The memory 144 may comprise suitable logic, circuitry, and/or code that may store data and/or control information. The radio 146 may comprise transmit circuitry and/or receive circuitry that may be enabled to calculate a sign metric of a downlink dedicated physical channel (DPCH) based on a plurality of transmit power control (TPC) bits received via the downlink dedicated physical channel (DPCH), wherein the plurality of TPC bits are not known when they are received. The radio links that belong to the same radio link set broadcast the same values of transmit power control (TPC) bits. The radio links that belong to different radio link sets may broadcast different TPC bits. The user equipment 120 may receive TPC bits via multiple radio links, for example, $RL_1$ and $RL_2$ simultaneously. In a handover situation, the user equipment 120 may receive signals from multiple radio link sets simultaneously.

The WCDMA specification defines the physical random access channel (PRACH) for mobile phone uplinks and the acquisition indicator channel (AICH) for BTS downlinks. Communication is established when the user equipment 120 completes its search for a base station, for example, BS 122 and synchronizes its PRACH uplink signal with the BTS AICH downlink signal. When operating properly, the base station recognizes a PRACH preamble from the user equipment 120 and responds with an AICH to establish a communication link. The user equipment 120 may use the PRACH to transmit its setting of its open loop power control to the base station 122. Incorrect data in the PRACH preamble or problems with the signal quality may cause missed connections, disrupt the capacity of the cell or prevent response from the base station 122.

Figure 1B:
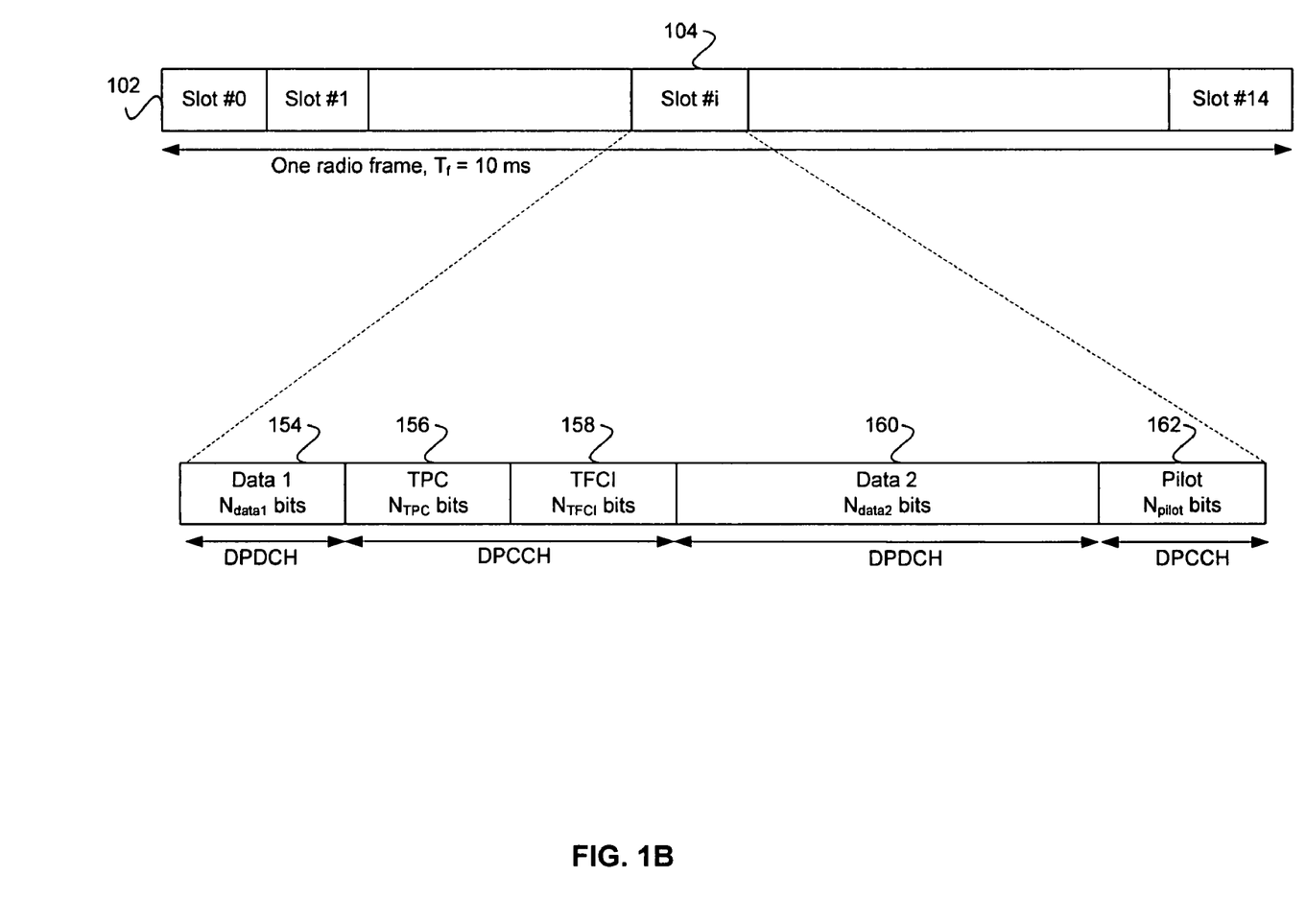
FIG. 1B is a block diagram of an exemplary radio frame format of a downlink dedicated physical channel (DPCH), in accordance with an embodiment of the invention.

FIG. 1B is a block diagram of an exemplary radio frame format of a downlink dedicated physical channel (DPCH), in accordance with an embodiment of the invention. Referring to FIG. 1B, there is shown a radio frame format 102, with a time period $T_f$ equal to 10 ms, for example. The radio frame 102 may comprise a plurality of slots, for example, 15 slots. Each of the slots in the radio frame 102, for example, slot #i 104 may comprise a plurality of dedicated physical data channels (DPDCH) and a plurality of dedicated physical control channels (DPCCH). The time period of each slot in the radio frame 102, for example, time period of slot #i may be equal to $10*2^k$ bits, where k=0 . . . 7, for example.

The DPDCH is a type of downlink channel, which may be represented as an I/Q code multiplexed within each radio frame 102. The downlink DPDCH may be utilized to carry data, for example, data 1 154 comprising $N_{data1}$ bits and data 2 160 comprising $N_{data2}$ bits. There may be zero, one, or a plurality of downlink dedicated physical data channels on each radio link.

The DPCCH is a type of downlink channel, which may be represented as an I/Q code multiplexed within each radio frame 102. The downlink DPCCH may be utilized to carry control information generated at the physical layer. The control information may comprise a transmit power control (TPC) block 156 comprising $N_{TPC}$ bits per slot, a transport format combination indicator (TFCI) block 158 comprising $N_{TFCI}$ bits per slot and a pilot block 162 comprising $N_{pilot}$ bits per slot.

Unlike the pilot bits 162 which are known a priori, that is, they are known when received by a receiver, the TPC bits 156 may be known or unknown when they are received. The term "a priori" means "formed or conceived beforehand." The phrase "not known" means that when some or all of the TPC bits are received at the receiver, the receiver cannot determine their actual values, and may need to determine the quality of the channel in order to determine whether the TPC bits are valid or not. Accordingly, various embodiments of the invention utilize channel quality to determine whether the TPC bits are valid or invalid. Therefore, conventional methods of computing a signal-to-noise ratio (SNR) metric based on multiplying the received signal by an a known sequence may not be used here.

In an embodiment of the invention, the quality of the downlink control channel transmitted with the downlink dedicated physical channel (DPCH) may be determined. Within one downlink DPCH, dedicated data may be transmitted in time-multiplex manner with control information. The control information may comprise pilot bits, transport format combination indicator (TFCI) bits and transmit power control (TPC) bits.

The user equipment 120 may be enabled to estimate the quality of the received TPC bits. The user equipment 120 may be, for example, a handheld phone or a wireless card in a laptop computer, for example. If the TPC bits are received under reliable channel conditions, they may be demodulated correctly by the user equipment 120 which in turn may detect correctly the power control commands that are communicated by the serving radio link, and adjust its transmit power appropriately, thereby avoiding interference. On the other hand, if the TPC bits are received under poor channel conditions, the TPC commands may be decoded incorrectly by the user equipment 120 which in turn may be transmitting inappropriate transmit power levels, creating undesirable interference and limiting the system capacity.

In another embodiment of the invention, in instances when multiple RL sets are active, such as RL1 and RL2, multiple TPC commands may be received at the user equipment 120. The TPC commands derived from RL1 and RL2 may comprise TPC bits, such as TPC bits 156. In addition, the received TPC bits from the multiple RL sets may be combined to determine a final TPC command for the user equipment 120. The final TPC command may be used by the user equipment 120 to determine whether to increase or decrease its transmit power. In one embodiment of the invention, the transmit power may be increased or decreased by a determined step size. Since some TPC commands may be received by the user equipment 120 under better channel conditions than others, a different weight value may be assigned to each TPC command in a radio link set.

In this regard, a reliability factor may be determined for each of the one or more TPC commands received by the user equipment 120 based on a sign metric measurement, for example. The reliability factor may be used to compute a weighted sum of the multiple received TPC commands, resulting in the accumulated final TPC command. In addition, the reliability factor of each received TPC command may be compared to a threshold value. If the reliability factor for a particular received TPC command is higher than the threshold value, the reliability factor and the TPC command may not be used in the calculation of the final TPC command. The sign of the final TPC command may be used to determine whether to increase or decrease the transmit power of the user equipment 120.

Figure 1C:
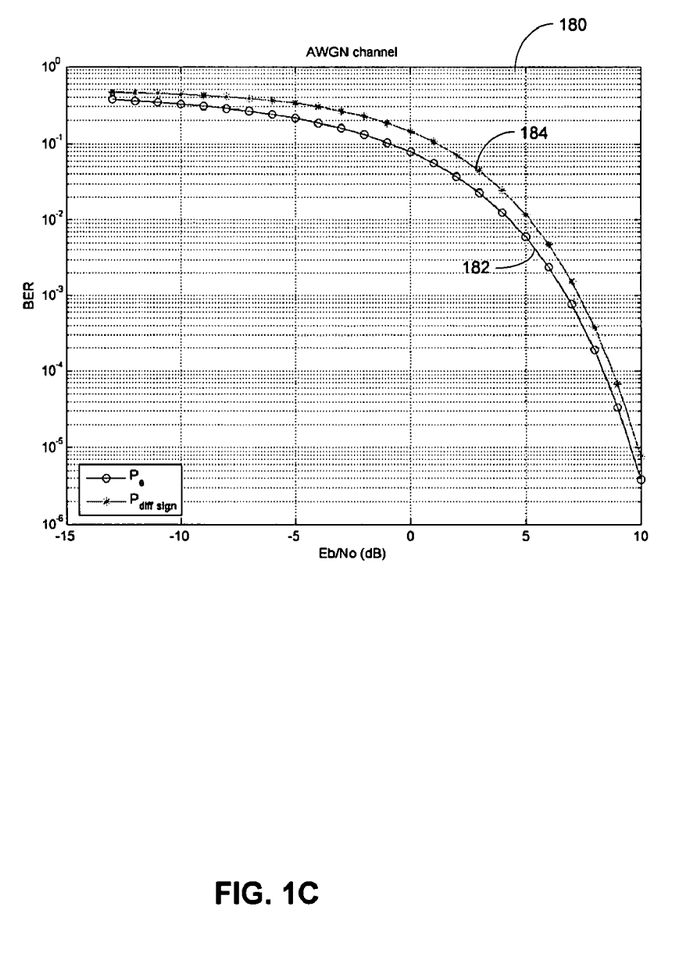
FIG. 1C is a graph illustrating the effect of a sign metric as an indicator of the quality of reception of the downlink DPCH, in accordance with an embodiment of the invention.

FIG. 1C is a graph 180 illustrating the effect of a sign metric as an indicator of the quality of reception of the downlink DPCH, in accordance with an embodiment of the invention. Referring to FIG. 1C, there is shown a graph of a probability of error ($P_e$) waveform 182 and a graph of a probability of error with different signs ($P_{diff.sign}$) waveform 184 plotted against the signal to nose ratio (SNR) per TPC bit.

The bit error rate (BER) of the received TPC bits may be related to the probability of receiving the TPC bits with different signs $P_{diff.sign}$. By design, the TPC bit field in a given slot may be either composed of ones, or of minus ones, or all TPC bits may be transmitted with the same sign. If the received TPC field comprises bits of different polarity, it may be inferred that the TPC bits are received with some probability of error. In an additive white gaussian noise (AWGN) channel, the BER of the TPC bits may be expressed according to the following equation:

$$P_e = \frac{1}{2}\mathrm{erfc}\left(\sqrt{\frac{E_b}{N_0}}\right)$$

where $E_b/N_0$ is the SNR per bit.

The TPC bit field may be composed of 2 bits for example. The probability of receiving TPC bit 1 and 2 with different polarity may be equal to the probability of receiving the TPC field as [−1,1] or [1,−1]. This probability may be expressed according to the following equation:

$$P_{diff.sign} = 2 \cdot P_e \cdot (1 - P_e)$$

The graph 180 illustrates that the two variables $P_e$ 182 and $P_{diff.sign}$ 184 have a correlated behaviour versus SNR, hence the knowledge of $P_{diff.sign}$ offers reliable insight on the quality of reception of the TPC bits.

Figure 2:
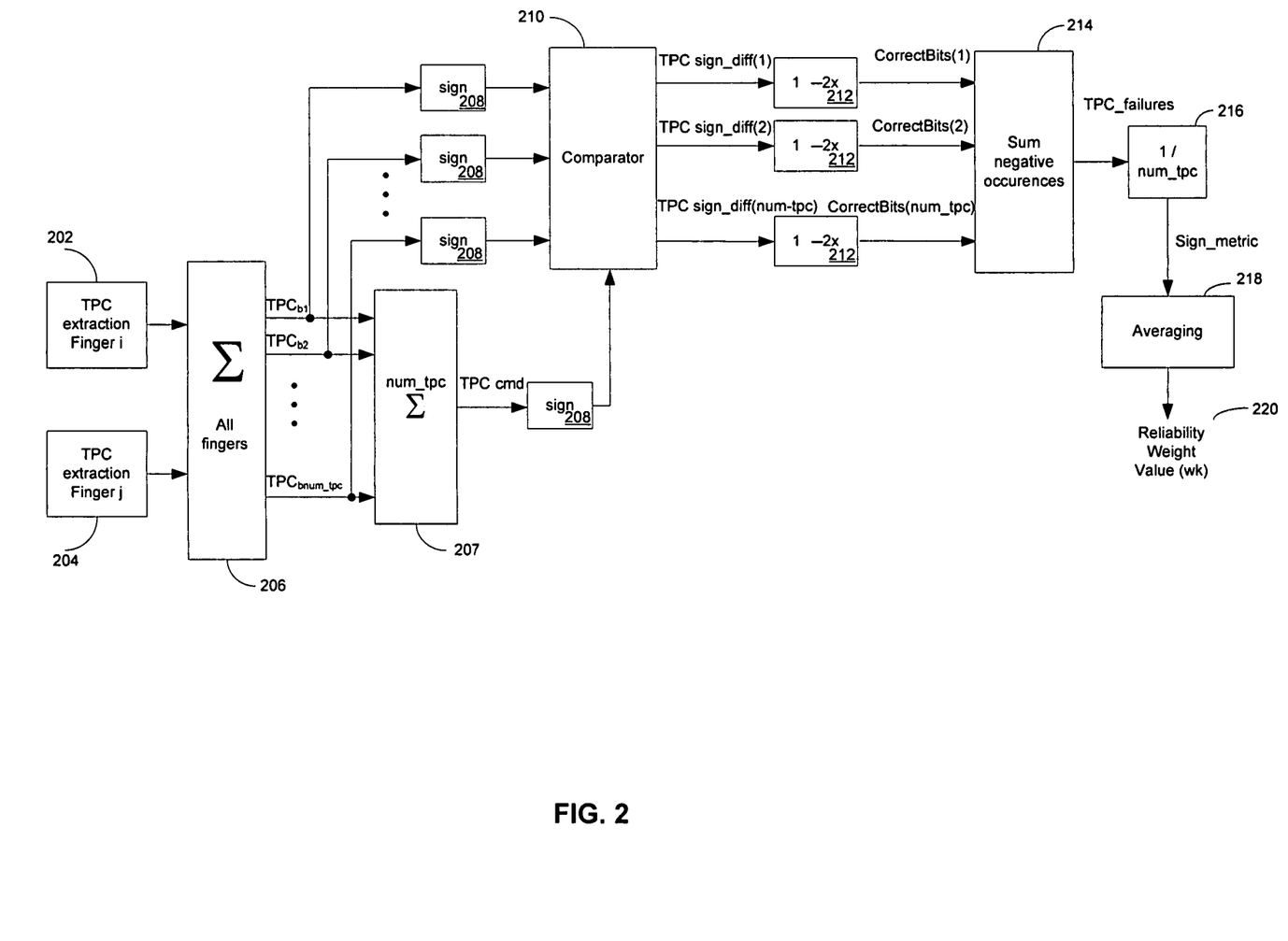
FIG. 2 is a block diagram illustrating a mechanism for determining reliability weights in a WCDMA network, in accordance with an embodiment of the invention.

FIG. 2 is a block diagram illustrating a mechanism for determining reliability weights in a WCDMA network, in accordance with an embodiment of the invention. Referring to FIG. 2, there is shown a plurality of TPC extraction fingers, for example, TPC extraction finger i 202 and TPC extraction finger j 204, a plurality of summing blocks 206 and 207, a plurality of sign detector blocks 208, a comparator block 210, a plurality of function blocks 212, a sum negative occurrences block 214, a divider block 216, and an averaging block 218.

A TPC sign metric may be computed corresponding to the TPC bits arriving from a given radio link (RL) set, indexed by k. A receiver technique that uses several baseband correlators to individually process several signal multipath components, for example, a rake receiver may be utilized. The correlator outputs also known as fingers may be combined to achieve improved communications reliability and performance. In a multipath-fading environment, with a receiver structure, for example, a RAKE or cluster processor (CPP) assigns fingers to the multiple received paths, for example, TPC extraction finger i 202 and TPC extraction finger j 204. The received TPC bits may be summed over those fingers belonging to the same radio link (RL) set by the summing block 206. At each slot, a set of num_tpc TPC bits may be obtained and denoted as $$\{\mathrm{TPC}_{b1}(k), \mathrm{TPC}_{b2}(k), \ldots, \mathrm{TPC}_{bnum\_tpc}(k)\}$$

where k is index of the RL set and num_tpc is the number of TPC bits per slot.

The corresponding TPC command may be generated by summing the TPC bits by the summing block 207 according to the following equation:

$$TPC_{cmd}(k) = \sum_{i=1}^{num\_tpc} TPC_{bi}(k)$$

The sign of each TPC bit detected by the sign detector blocks 208 may be then compared to the sign of the TPC command by the comparator block 210.

$$TPC\_sign\_diff(i,k) = (\text{sign}(TPC_{bi}(k)) \stackrel{?}{=} \text{sign}(TPC_{cmd}(k)))\ i=1,\ldots,num\_tpc$$

The value of TPC_sign_diff(i,k) may be equal to 0 if there is a sign agreement; otherwise it may be equal to 1.

A variable denoted by, for example, CorrectBits may be computed utilizing the plurality of function blocks 212 according to the following equation:

$$CorrectBits(i,k) = 1 - 2 \cdot TPC\_sign\_diff(i,k),\ i=1,\ldots,num\_tpc$$

The number of sign disagreements, or equivalently TPC failures, over the num_tpc bits may be calculated by the sum negative occurrences block 214 according to the following algorithm:

```
TPC_failures(k) = 0
for i = 1,...,num_tpc
{
    if (CorrectBits(i,k) ≤ 0)
        TPC_failures(k) = TPC_failures(k) + 1;
}
```

The sign metric for RL set k updated every slot may be calculated by the divider block 216 according to the following equation:

$$\text{sign\_metric}(k) = \frac{TPC\_failures(k)}{num\_tpc}$$

The generated sign metric sign_metric (k) may be averaged over a given time window by the averaging block 218 to generate sign_metric_avg (k) 220. An integrate-and-dump method or an IIR filter may be utilized to carry out the averaging operation, for example. The averaged sign metric, sign_metric_avg (k) 220 may be used as a reliability weight value wk during the determination of a total TPC command for use by the user equipment 120 (FIG. 1A).

Figure 3:
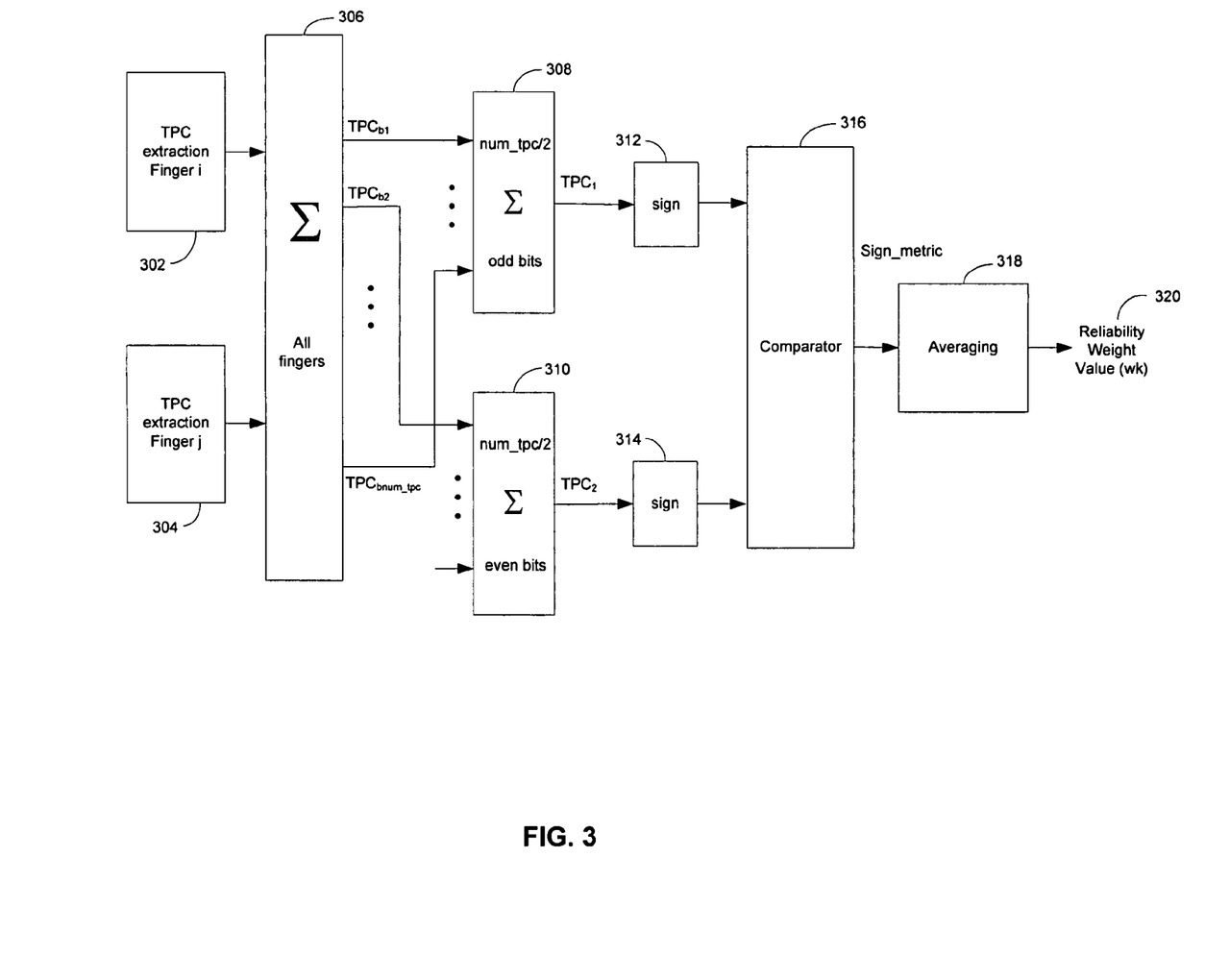
FIG. 3 is a block diagram illustrating another mechanism for determining reliability weights in a WCDMA network, in accordance with an embodiment of the invention.

FIG. 3 is a block diagram illustrating another mechanism for determining reliability weights in a WCDMA network, in accordance with an embodiment of the invention. Referring to FIG. 3, there is shown a plurality of TPC extraction fingers, for example, TPC extraction finger i 302 and TPC extraction finger j 304, a plurality of summing blocks 306, 308 and 310, a plurality of sign detector blocks 312 and 314, a comparator block 316, and an averaging block 318.

A TPC sign metric may be computed corresponding to the TPC bits arriving from a given radio link (RL) set, indexed by k. In a multipath-fading environment with a receiver structure, for example, a RAKE or cluster path processor (CPP), the receiver structure may assign fingers to the multiple received paths, for example, TPC extraction finger i 302 and TPC extraction finger j 304. The received TPC bits may be summed over all fingers belonging to the same radio link (RL) set by the summing block 306. At each slot, a set of num_tpc TPC bits may be obtained and denoted as $$\{TPC_{b1}(k), TPC_{b2}(k), \ldots, TPC_{bnum\_pc}(k)\}$$

where k is index of the RL set and num_tpc is the number of TPC bits per slot.

In accordance with an embodiment of the invention, the sign of each bit may be compared against each other. For slot formats where num_tpc>2, the algorithm may first combine the bits in a manner such that it reduces the number of bits to 2. The reduction to 2 bits may be achieved by the summing blocks 308 and 310 according to the following equations:

$$TPC_1(k) = \sum_{i=1,3,\ldots}^{num\_tpc} TPC_{bi}(k),$$

which may represent summation over odd-indexed bits, and $$TPC_2(k) = \sum_{i=2,4,\ldots}^{num\_tpc} TPC_{bi}(k),$$

which may represent summation over even-indexed bits. The sign of TPC bit 1 and TPC bit 2 may be detected by the sign detector blocks 312 and 314 and compared against each other by the comparator block 316, yielding the sign metric according to the following equation:

$$\text{sign\_metric}(k) = (\text{sign}(TPC_1(k)) \stackrel{?}{=} \text{sign}(TPC_2(k)))$$

The value of sign_metric(k) may be equal to 0 if is there is a sign agreement, otherwise it may be equal to 1. The generated sign metric sign_metric (k) may be averaged over a given time window by the averaging block 318 to generate sign_metric_avg (k) 320.

The averaging block 318 may be implemented via an infinite impulse response (IIR) filter, or via a moving average window of fixed size. The length of the averaging filter may be selected with respect to the channel variation rate that may be measured by Doppler frequency. The Doppler frequency may be an inverse function of the channel coherence time. The channel coherence time may correspond to a time period within which two observations of the channel are highly correlated, for example. In addition, the averaging block 318 may be selected so that the channel quality may be estimated fast enough so that it tracks the channel fades over time. In such instances, the length of the filter of the averaging block 318 may be smaller than the channel coherence time. The averaging block 318 may also be selected so that the estimated channel quality is a long-term measurement, averaged over a plurality of fades. In such instances, the length of the filter may be longer than the channel coherence time.

Figure 4:
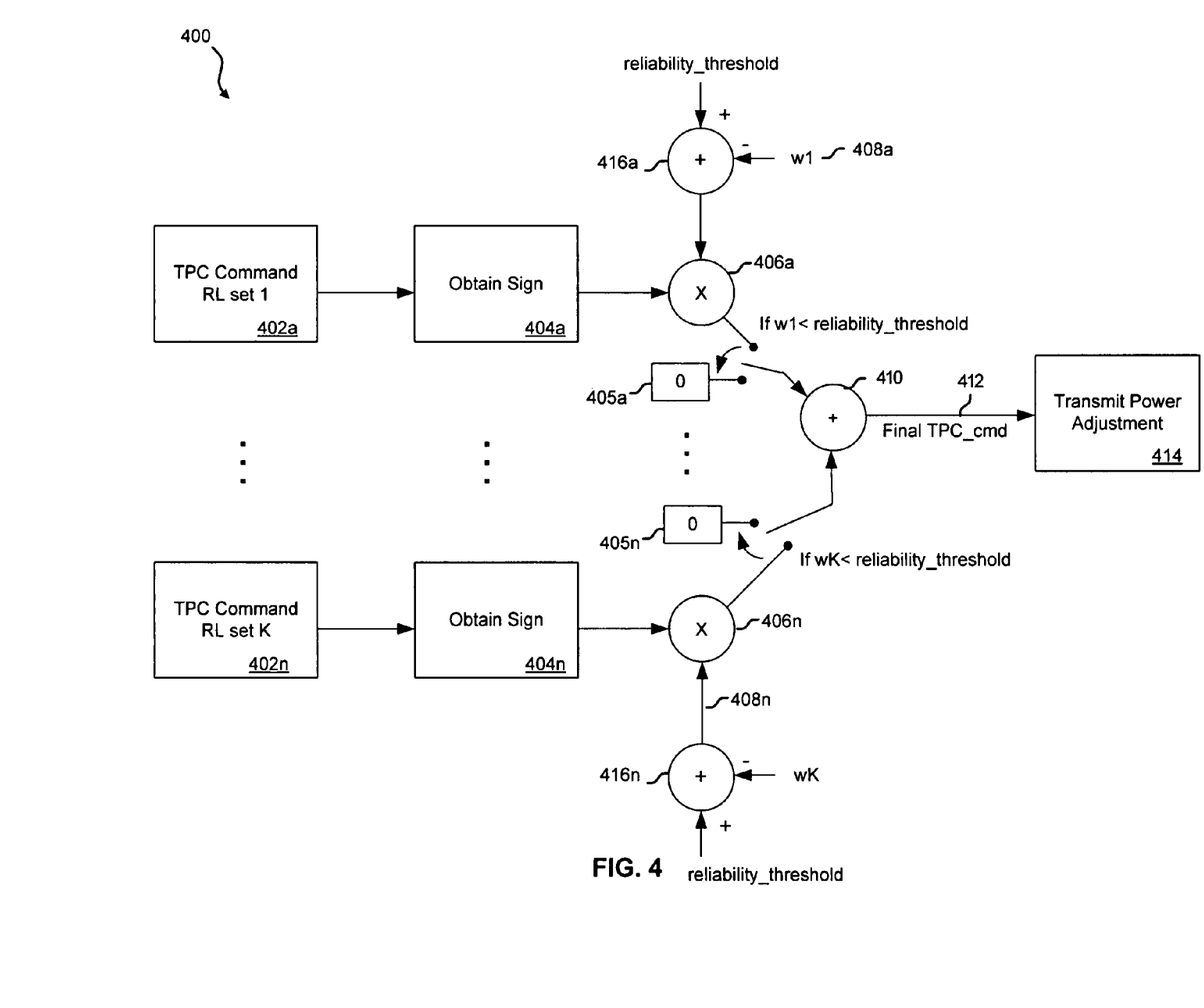
FIG. 4 is a block diagram of an exemplary system for weighted combination of multiple TPC commands, in accordance with an embodiment of the invention.

FIG. 4 is a block diagram of an exemplary system for weighted combination of multiple TPC commands, in accordance with an embodiment of the invention. Referring to FIG. 4, the system 400 may comprise a plurality of received TPC commands 402a, ..., 402n, a plurality of sign extraction blocks 404a, ..., 404n, a plurality of multipliers 406a, ..., 406n, a plurality of zero multiplication blocks 405a, ..., 405n, a plurality of adders 410 and 416, and a transmit power adjustment block 414. The received TPC commands 402a, ..., 402n may correspond to radio link sets 1, ..., k, respectively. In this regard, a total of k received TPC commands may be used in the determination of a final or adjusted TPC command 412.

The sign extraction blocks 404a, ..., 404n may comprise suitable circuitry, logic, and/or code and may enable determination of the sign of a corresponding TPC command. In this regard, the sign extraction blocks 404a, ..., 404n may generate either (−1) or (+1) as a final result. The generated signs may be communicated to the corresponding multipliers 406a, ..., 406n. The multipliers 406a, ..., 406n may comprise suitable circuitry, logic, and/or code and may enable multiplication of the received sign by a value equal to the subtraction of a corresponding reliability weight value 408a, ..., 408n from a threshold value, or reliability_threshold to generate weighted sign values.

In one embodiment of the invention, it may be determined whether each of the reliability weight values 408a, ..., 408n is higher than the reliability_threshold. If a reliability weight value is higher than the reliability_threshold, the weighted sign value may be multiplied by zero by a corresponding zero multiplication block from the plurality of zero multiplication blocks 405a, ..., 405n. In this regard, if the reliability weight value is higher than the reliability_threshold, the corresponding weighted sign value may not be included in the determination of the final TPC command 412.

If the reliability weight value is smaller than the reliability_threshold, the weighted sign values may be added by the adder 410 to generate the total TPC command 412. The transmit power adjustment block 414 may comprise suitable circuitry, logic, and/or code and may enable adjustment of the transmit power based on the determined final TPC command 412. The final TPC command 412 may be used to adjust the transmit power based on, for example, the sign of the final TPC command 412.

In one embodiment of the invention, the received TPC commands 402a, ..., 402n may belong to the same radio link (RL) set. Since radio links belonging to the same RL set transmit the same TPC command, the TPC commands originating from radio links belonging to the same RL set may be combined with equal weights. In this regard, the reliability weights 408a, ..., 408n may be the same, for example 1 or −1.

In another embodiment of the invention, the received TPC commands 402a, ..., 402n may belong to different RL sets. For example, the received TPC commands 402a, ..., 402n may belong to RL sets 1, ..., K, respectively. In this regard, there may be one TPC command for each of the K RL sets, TPC_cmd(k), k=1, ... K. The overall accumulated command TPC_cmd 512 may be computed using the following exemplary pseudo code:

```
Initialize the accumulated command to zero,   Accum_cmd = 0
For (k=loop over RL sets)
{
Take sign of TPC_cmd(k)
If (wk< reliability_threshold)
Accum_cmd = Accum_cmd + (sign of TPC_cmd(k) ) *
( reliability_threshold − wk)
}
``` where wk are the reliability weights 408a, ..., 408n.

The value of Accum_cmd may correspond to the total TPC command 412. The transmit power adjustment block 414 may determine whether to increase or decrease the transmit power based on the sign of Accum_cmd. For example, if the sign of Accum_cmd is negative, the transmit power may be decreased by a given step size. Similarly, if the sign of Accum_cmd is positive, the transmit power may be increased by a given step size.

The reliability_threshold may be selected to correspond to a TPC command error rate of X %, for example. In this regard, a TPC command with an estimated reliability weight value corresponding to an error rate of X % or higher may be discarded from the calculation of the final TPC command 412. With regard to an embodiment of the invention described in FIG. 2, the reliability_threshold value may be a function of the number of TPC bits per slot, denoted by, for example, num_tpc. In this regard, there may be a different value of reliability_threshold for each possible num_tpc value. In addition, different slot formats may have different num_tpc values. With regard to an embodiment of the invention described in FIG. 3, only one value for reliability_threshold may be used resulting from the reduction of the TPC bits to 2 bits. The reliability_threshold value may be valid for all possible num_tpc values.

The reliability weight values 408a, ..., 408n may be calculated based on computing a TPC sign metric, sign_metric_avg(k), corresponding to the TPC bits arriving from a given RL set. In this regard, the reliability weight value wk may be calculated from the following equation:

$$w_k = \text{sign\_metric\_avg}(k)$$

Calculation of an exemplary TPC sign metric, sign_metric_avg(k), corresponding to the TPC bits arriving from a given RL set, is described above with regard to FIGS. 2 and 3.

Figure 5:
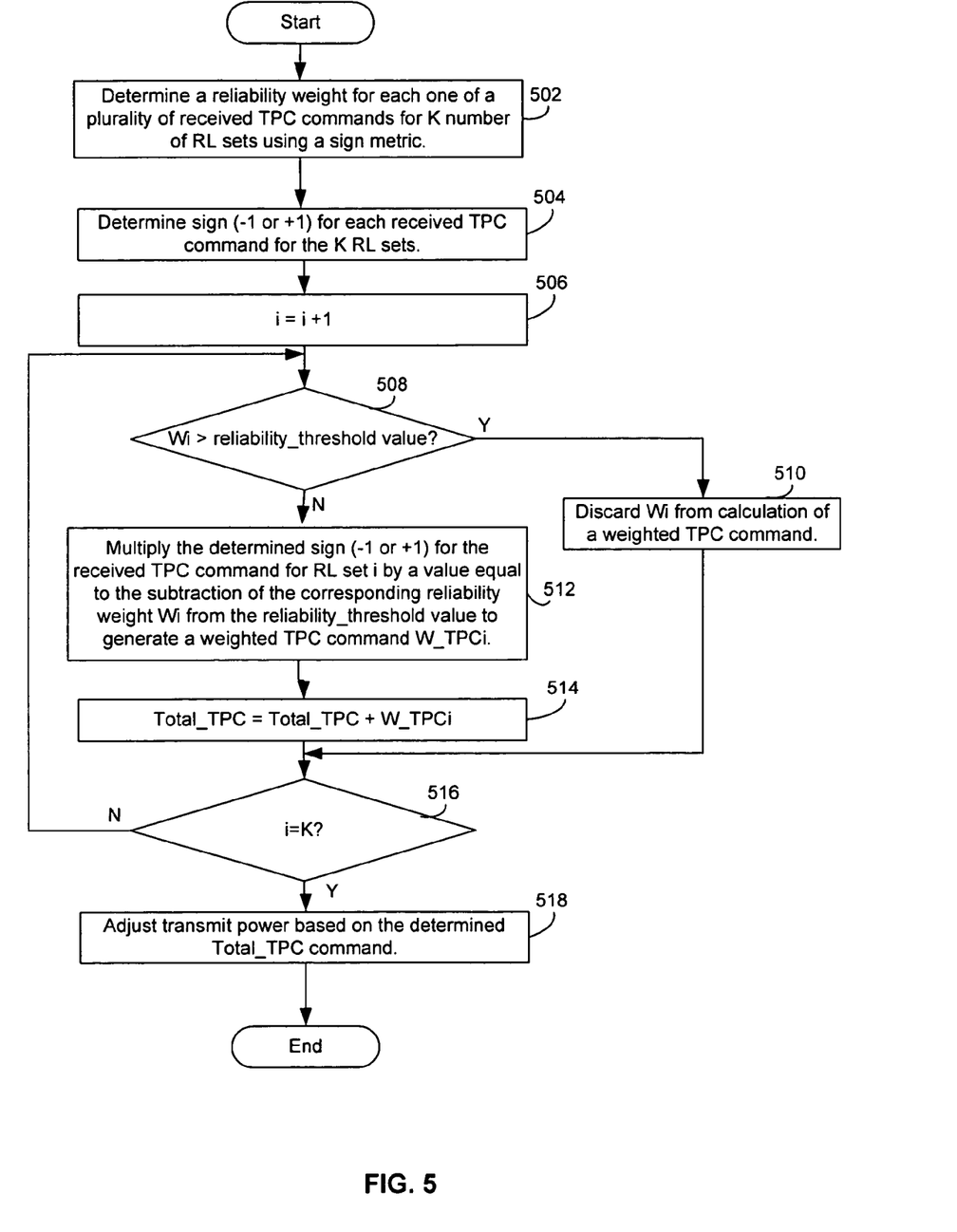
FIG. 5 is a flowchart illustrating exemplary steps for determining a total TPC command in a WCDMA network, in accordance with an embodiment of the invention.

FIG. 5 is a flowchart illustrating exemplary steps for determining a total TPC command in a WCDMA network, in accordance with an embodiment of the invention. Referring to FIGS. 4 and 5, at 502, reliability weights 408a, ..., 408n may be determined for each one of a plurality of received TPC commands 402a, ..., 402n for K radio link (RL) sets. The reliability weights 408a, ..., 408n may be determined based on a sign metric. At 504, the sign extraction blocks 404a, ..., 404n may determine the sign of each of the received TPC commands 402a, ..., 402n. At 506, a counter i may be incremented by 1. At 508, it may be determined whether reliability weight $w_i$ is greater than a reliability threshold value. If the reliability weight $w_i$ is greater than the reliability threshold value, at 510, $w_i$ may be discarded from the calculation of the total TPC command 412. Processing may then resume at step 516.

If the reliability weight $w_i$ is not greater than the reliability threshold value, at 512, the determined sign of the received TPC command for RL set i may be multiplied by a value equal to the subtraction of the corresponding reliability weight $w_i$ from the reliability_threshold value to generate a weighted TPC command w_TPC$_i$. At 514, the total TPC command 412 may be incremented by the weighted TPC command w_TPC$_i$. At 516, it may be determined whether i=k. If i is lower than k, processing may resume at step 508. If i is equal to k, at 518, the transmit power adjustment block 414 may adjust the transmit power based on the total TPC command 412.

In accordance with an embodiment of the invention, a method and system for processing TPC commands in a WCDMA network based on a sign metric may comprise circuitry that enables calculation of a sign metric of a downlink DPCH 102 based on a plurality of TPC bits 156 received via the downlink DPCH 102. A value of at least one of the plurality of TPC bits 156 may not be known when the at least one of the plurality of TPC bits 156 is received. The sign metric may specify an error associated with the plurality of TPC bits. Transmit power adjustment block 414 within the user equipment 120 may enable adjusting of transmit power for a signal transmitted via at least one uplink communication channel based on the calculated sign metric. At least one processor within the user equipment 120, such as CPU 142 may enable calculation of at least one reliability weight value for at least a portion of the received TCP bits 156, based on the calculated sign metric.

The at least one processor 142 within the user equipment 120 may enable calculation of a total TPC command 412 for the at least one uplink communication path based on the plurality of received TPC bits 156 and the calculated at least one reliability weight value 408a, ..., 408n. The at least one processor 142 within the user equipment 120 may enable discarding of a selected one of the at least one reliability weight value from the calculation of the total TPC command, if the selected one of the at least one reliability weight value is higher than a threshold value. The transmit power adjustment block 414 within the user equipment 120 may enable adjusting of the transmit power for the at least one uplink communication channel based on the calculated total TPC command. Summing circuitry within the user equipment 120, such as summing blocks 206 and/or 207 may enable summing of portions of the plurality of TPC bits 156 that are received via a plurality of multipaths over the downlink dedicated physical channel to generate a TPC command. The comparator 210 within the user equipment 120 may enable comparing of a sign of each of the plurality of TPC bits 156 with a sign of the generated TPC command.

The processor 142 within the user equipment 120 may enable calculation of a sign indicator based on the comparison of the sign of each of the plurality of TPC bits with the sign of the generated TPC command. The processor 142 within the user equipment 120 may enable calculation of a number of TPC failures between the sign of each of the plurality of TPC bits with the sign of the generated TPC command based on the calculated sign indicator. The processor 142 within the user equipment 120 may enable calculation of the sign metric of the DPCH 102 based on the calculated number of TPC failures between the sign of each of the plurality of TPC bits with the sign of the generated TPC command. Summing blocks 306, 308 and/or 310 within the user equipment 120 may enable summing of portions of the plurality of TPC bits 156 over odd indexed bits to generate a first TPC bit.

Summing blocks 306, 308 and/or 310 within the user equipment 120 may enable summing of portions of the plurality of TPC bits 156 over even indexed bits to generate a second TPC bit. The comparator 316 within the user equipment 120 may enable comparing of a sign of the generated first TPC bit and a sign of the generated second TPC bit. The processor 142 within the user equipment 120 may enable calculation of the sign metric of the DPCH 102 based on the comparison of the sign of the generated first TPC bit and the sign of the generated second TPC bit.

Another embodiment of the invention may provide a machine-readable storage having stored thereon, a computer program having at least one code section for signal processing, the at least one code section being executable by a machine for causing the machine to perform steps as disclosed herein. For example, computer program and/or equivalent code thereof, may be stored in memory 144 and may be executed by processor 142.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for signal processing, the method comprising:
calculating a sign metric of a downlink dedicated physical channel (DPCH) based on a plurality of transmit power control (TPC) bits received via said downlink DPCH, wherein a value of at least one of said plurality of TPC bits is not known when said at least one of said plurality of TPC bits is received, and said sign metric specifies an error associated with said plurality of TPC bits;
calculating at least one reliability weight value for at least a portion of said received TPC bits based on said calculated sign metric; and
adjusting transmit power for a signal transmitted via at least one uplink communication channel based on said calculated sign metric.

2. The method according to claim 1, comprising averaging said sign metric over a time window.

3. The method according to claim 1, comprising calculating a total TPC command for said at least one uplink communication path based on said plurality of received TPC bits and said calculated at least one reliability weight value.

4. The method according to claim 3, comprising, if a selected one of said at least one reliability weight value is higher than a threshold value, discarding said selected one of said at least one reliability weight value from said calculation of said total TPC command.

5. The method according to claim 4, wherein said threshold value is based on one or both of a TPC command error rate and/or a number of said plurality of received TPC bits per slot.

6. The method according to claim 3, comprising adjusting said transmit power for said at least one uplink communication channel based on said calculated total TPC command.

7. The method according to claim 1, comprising:
summing portions of said plurality of TPC bits that are received via a plurality of multipaths over said downlink dedicated physical channel to generate a TPC command; and
comparing a sign of each of said plurality of TPC bits with a sign of said generated TPC command.

8. The method according to claim 7, comprising calculating a sign indicator based on said comparison of said sign of each of said plurality of TPC bits with said sign of said generated TPC command.

9. The method according to claim 8, comprising calculating a number of TPC failures between said sign of each of said plurality of TPC bits with said sign of said generated TPC command based on said calculated sign indicator.

10. The method according to claim 9, comprising calculating said sign metric of said DPCH based on said calculated number of TPC failures between said sign of each of said plurality of TPC bits with said sign of said generated TPC command.

11. The method according to claim 1, comprising summing portions of said plurality of TPC bits over odd indexed bits to generate a first TPC bit.

12. The method according to claim 11, comprising summing portions of said plurality of TPC bits over even indexed bits to generate a second TPC bit.

13. The method according to claim 12, comprising comparing a sign of said generated first TPC bit and a sign of said generated second TPC bit.

14. The method according to claim 13, comprising calculating said sign metric of said DPCH based on said comparison of said sign of said generated first TPC bit and said sign of said generated second TPC bit.

15. A system for signal processing, the system comprising:
circuitry that enables calculation of a sign metric of a downlink dedicated physical channel (DPCH) based on a plurality of transmit power control (TPC) bits received via said downlink DPCH, wherein a value of at least one of said plurality of TPC bits is not known when said at least one of said plurality of TPC bits is received, and said sign metric specifies an error associated with said plurality of TPC bits;
said circuitry enables calculation of at least one reliability weight value for at least a portion of said received TPC bits based on said calculated sign metric; and
said circuitry enables adjusting of transmit power for a signal transmitted via at least one uplink communication channel based on said calculated sign metric.

16. The system according to claim 15, wherein said circuitry enables averaging of said sign metric over a time window.

17. The system according to claim 15, wherein said circuitry enables calculation of a total TPC command for said at least one uplink communication path based on said plurality of received TPC bits and said calculated at least one reliability weight value.

18. The system according to claim 17, wherein said circuitry enables discarding of said selected one of said at least one reliability weight value from said calculation of said total TPC command, if a selected one of said at least one reliability weight value is higher than a threshold value.

19. The system according to claim 18, wherein said threshold value is based on one or both of a TPC command error rate and a number of said plurality of received TPC bits per slot.

20. The system according to claim 17, wherein said circuitry enables adjusting of said transmit power for said at least one uplink communication channel based on said calculated total TPC command.

21. The system according to claim 15, wherein said circuitry enables summing of portions of said plurality of TPC bits that are received via a plurality of multipaths over said downlink dedicated physical channel to generate a TPC command, and wherein said circuitry enables comparing of a sign of each of said plurality of TPC bits with a sign of said generated TPC command.

22. The system according to claim 21, wherein said circuitry enables calculation of a sign indicator based on said comparison of said sign of each of said plurality of TPC bits with said sign of said generated TPC command.

23. The system according to claim 22, wherein said circuitry enables calculation of a number of TPC failures between said sign of each of said plurality of TPC bits with said sign of said generated TPC command based on said calculated sign indicator.

24. The system according to claim 23, wherein said circuitry enables calculation of said sign metric of said DPCH based on said calculated number of TPC failures between said sign of each of said plurality of TPC bits with said sign of said generated TPC command.

25. The system according to claim 15, wherein said circuitry enables summing of portions of said plurality of TPC bits over odd indexed bits to generate a first TPC bit.

26. The system according to claim 25, wherein said circuitry enables summing of portions of said plurality of TPC bits over even indexed bits to generate a second TPC bit.

27. The system according to claim 26, wherein said circuitry enables comparing of a sign of said generated first TPC bit and a sign of said generated second TPC bit.

28. The system according to claim 27, wherein said circuitry enables calculation of said sign metric of said DPCH based on said comparison of said sign of said generated first TPC bit and said sign of said generated second TPC bit.

* * * * *